(12) United States Patent
Perrino et al.

(10) Patent No.: US 12,030,815 B2
(45) Date of Patent: Jul. 9, 2024

(54) MORTAR COMPOSITION FOR ACOUSTIC DAMPING AND FIRE PROTECTION

(71) Applicant: SIKA TECHNOLOGY AG, Baar (CH)

(72) Inventors: Luigi Perrino, Nago Torbole (IT); Carsten Brutus, Ishoej (DK); Romualdo Leonetta, Como (IT); Luz Granizo, Madrid (ES); Urs Jäger, Jona (CH)

(73) Assignee: SIKA TECHNOLOGY AG, Baar (CH)

( * ) Notice: Subject to any disclaimer, the term of this patent is extended or adjusted under 35 U.S.C. 154(b) by 326 days.

(21) Appl. No.: 17/441,255

(22) PCT Filed: May 6, 2020

(86) PCT No.: PCT/EP2020/062574
§ 371 (c)(1),
(2) Date: Sep. 20, 2021

(87) PCT Pub. No.: WO2020/225300
PCT Pub. Date: Nov. 12, 2020

(65) Prior Publication Data
US 2022/0332646 A1  Oct. 20, 2022

(30) Foreign Application Priority Data

May 6, 2019  (EP) .................................. 19172828

(51) Int. Cl.
*C04B 28/10* (2006.01)
*C04B 14/06* (2006.01)
(Continued)

(52) U.S. Cl.
CPC .............. *C04B 28/16* (2013.01); *C04B 14/06* (2013.01); *C04B 14/24* (2013.01); *C04B 18/027* (2013.01);
(Continued)

(58) Field of Classification Search
CPC ....... C04B 14/06; C04B 14/24; C04B 18/027; C04B 24/2676; C04B 28/16; C04B 2111/28; C04B 2111/40; C04B 2111/52
(Continued)

(56) References Cited

U.S. PATENT DOCUMENTS 4,663,363 A * 5/1987 Blount .................... C04B 28/26
521/154
2014/0175320 A1   6/2014 Thomas et al.
2017/0022106 A1 * 1/2017 Buttner .................. C04B 14/18

FOREIGN PATENT DOCUMENTS

EP      1531209 A1   5/2005
EP      2690075 A1   1/2014
(Continued)

OTHER PUBLICATIONS

Jul. 20, 2020 International Search Report issued in International Patent Application No. PCT/EP2020/062574.
Lin Jianhao et al.; "Civil Engineering Materials"; Harbing Engineering University Press; 2013; Vol. 1; pp. 161.
(Continued)

*Primary Examiner* — James J Buckle, Jr.
(74) *Attorney, Agent, or Firm* — Oliff PLC

(57) ABSTRACT

A mortar composition, in particular for preparing a viscoelastic structure and/or a fire barrier, including: a) 15-50 wt.-% of a hydraulic binder, b) 5-35 wt.-% of lightweight aggregates, c) 5-25 wt. % of further aggregates which have a particle density that is higher than the particle density of the lightweight aggregates, and d) 10-50 wt.-% of a polymer.

15 Claims, 3 Drawing Sheets

(51) Int. Cl.
*C04B 14/24* (2006.01)
*C04B 18/02* (2006.01)
*C04B 24/26* (2006.01)
*C04B 28/16* (2006.01)
*E04F 13/00* (2006.01)
*E04F 15/18* (2006.01)
*C04B 111/28* (2006.01)
*C04B 111/40* (2006.01)
*C04B 111/52* (2006.01)

(52) U.S. Cl.
CPC ...... *C04B 24/2635* (2013.01); *C04B 24/2676* (2013.01); *E04F 15/18* (2013.01); *C04B 2111/28* (2013.01); *C04B 2111/40* (2013.01); *C04B 2111/52* (2013.01)

(58) Field of Classification Search
USPC ......................................................... 52/404.1
See application file for complete search history.

(56) References Cited

FOREIGN PATENT DOCUMENTS

| | | |
|---|---|---|
| EP | 3348535 A1 | 7/2018 |
| JP | 2017-210407 A | 11/2017 |
| WO | 2009/134299 A2 | 11/2009 |
| WO | 2014/016131 A1 | 1/2014 |

OTHER PUBLICATIONS

Huang Shiyuan et al.; "Modern Concrete Technology"; Shanxi Science and Technology Press; 1998; vol. 1; pp. 282.

Huang Shiping et al., "Implementation Manual of Standards for Constructions and Acceptance Check of Building Corrosion Resistant Engineering, vol. 1", 1st Edition, Santai Publishing House, (2003), pp. 739-740.

L. Ying et al.; "Fundamentals of Engineering Materials and Forming Technology"; Beijing Institute of Technology Press; Jul. 2009; pp. 190-191.

* cited by examiner

MORTAR COMPOSITION FOR ACOUSTIC DAMPING AND FIRE PROTECTION

TECHNICAL FIELD

The invention relates to a mortar composition, in particular for preparing viscoelastic bodies or structures and/or fire barriers. Another object of the invention is a shaped body comprising the mortar composition after hardening with water and a structure, in particular a floor, a wall or a ceiling, comprising the shaped body. Moreover the invention relates to uses of the mortar composition, the shaped body and the structure.

BACKGROUND ART

In vehicles, buildings, or offshore installations, the transmission of undesired sound or vibrations trough structural elements, floors, walls or ceilings is a challenging problem. This is in particular true in metal based constructions, such as e.g. cars, ships and offshore installations, with large flat areas.

As a consequence, flat areas such as floors are not only expected to be smooth and level, but to play a major part in noise and vibration suppression. On board of ships, for example, there are several dominant sound and vibration sources like diesel engines, gearboxes and propellers that emit sound energy. In the domain of acoustic and vibration engineering, the energy released by these sources is defined in two ways:
  Vibration: Dynamic movements in solids and liquids
  Sound: Variations in air pressure in the audible frequency range (20 Hz-20 kHz)

On a vessel, the most dominant transmission of undesirable sound or noise is through the structure of the vessel. The engine, the propeller, the gearbox etc. each creates energy waves that emits as structure-borne noise into the air from the large flat areas, such as e.g. decks and bulkheads, that act as sounding boards.

Airborne noise is less dominant as sounds carried along companionways and laterally through partitions and bulkheads reduce substantially with the distance from the source.

In order to reduce vibrations and noise, viscoelastic damping systems can be applied directly onto vibrating areas or surfaces. These systems reduce the radiation of low frequency noise and dissipate the sound energy into heat.

Several viscoelastic damping systems are commercially available. A highly efficient system consists of a thin two-component polyurethane layer which is directly laid on a support surface to be damped (e.g. a deck surface made of steel or aluminum) and a constraining layer (e.g. a mortar based layer or steel tiles) put on top of the polyurethane layer. Within this system, the polyurethane layer functions as viscoelastic dampening element as well as a primer between the metal surface and the constraining layer. Although such viscoelastic damping systems have a significant dampening effect, polyurethane layers may not always be suitable for specific applications.

Furthermore, WO 2014/016131 A1 (Sika Technology AG) describes a mortar composition for preparing viscoelastic structures. The mortar composition is based on hydraulic binder, aggregates, a polymer, and a layered material. The so produced viscoelastic structures can be used as replacements for known polyurethane systems.

Besides vibration and sound dampening in vehicles, buildings, or offshore installations, another important aspect is the prevention of the spread of fire. Typically, this is achieved via (i) passive fire protection, e.g. the installation of firewalls and fire rated floor assemblies to form fire compartments intended to limit the spread of fire, high temperatures, and smoke or via (ii) active fire protection, e.g. manual and automatic detection and suppression of fires, for example with fire sprinkler systems and/or alarm systems.

In this regard, WO 2009/134299 A2 (Kaneka Corporation) describes a fire barrier system comprising a flexible graphite sheet which is suitable for installation in aircrafts, ships or offshore platforms. Although such fire barriers are efficient, they need to be installed in addition to the vibration and sound dampening systems.

There is thus still a need to develop improved systems which allow for acoustic damping and/or the prevention of the spread of fire and which overcome the aforementioned drawbacks.

DISCLOSURE OF THE INVENTION

It is an object of the present invention to provide compositions which allow for producing acoustic damping elements. In particular the damping element should absorb noise in the audible frequency range, especially in the frequency range of 50-5,000 Hz. In addition, the compositions should preferably allow for producing acoustic damping elements with fire barrier properties.

The compositions or the damping elements, respectively, should in particular be suitable for marine applications and/or automotive applications. Moreover, the compositions should preferably be free of isocyanates and corrosive compounds. Preferably, the compositions or the damping element, respectively, should additionally have good adhesion to different kind of materials, in particular to mortar, concrete and metals, such as e.g. steel, aluminum and zinc. As well, the damping element should be safe and easy to produce and use. Also, the compositions used for producing the damping element should preferably be applicable using standard equipment.

Surprisingly, it has been found that these objects are achieved by the features of claim 1. Thus, the core of the invention is a mortar composition, in particular for preparing a viscoelastic structure and/or an acoustic damping element and/or a fire barrier, comprising or essentially consisting of:
  a) 15-50 wt.-% of a hydraulic binder,
  b) 5-35 wt.-% of lightweight aggregates,
  c) 5-25 wt. % of further aggregates which have a particle density that is higher than the particle density of the lightweight aggregates,
  d) 10-50 wt.-% of at least one polymer.

Such mortar composition can be used to produce advantageous viscoelastic structures or acoustic damping elements which are capable of absorbing noise in the frequency range of 50-5,000 Hz, e.g. in automotive and marine applications, without a need of any isocyanate based materials or corrosive compounds.

Producing such elements or structures is quite easy and safe: The mortar composition, in particular in dry state, is mixed with an appropriate amount of water. After hardening of the mortar composition, the viscoelastic structure or acoustic damping element is ready. Furthermore, the mortar composition itself can be a one-component mixture. This will exclude the risk of a mix up or wrong dosing of individual components by users.

Furthermore, the inventive mortar compositions can be formulated such that they are rather fast setting and drying, in particular when using Portland cement in combination with aluminate cement and/or sulphoaluminate cement as hydraulic binders. Such kind of compositions are especially suitable for use with low- and non-absorbent substrates, such as e.g. substrates made of metal.

As could be shown, the mortar compositions or the viscoelastic structures made thereof feature good adhesion to different kind of materials, in particular to mortar, concrete and metals, such as e.g. steel, aluminum and zinc. Therefore, the viscoelastic structures or acoustic damping elements made from the inventive mortar compositions are highly compatible with elements of existing damping systems, such as e.g. existing constraining layers.

Surprisingly, the inventive mortar compositions show a rather strong adhesion to metallic substrates, even without the need of primers. Therefore, the compositions are in particular beneficial for use for application on structural elements made of metal in vehicles, buildings and offshore installations.

Additionally, the inventive compositions are highly suitable as passive fire protection systems, e.g. as fire barriers, to limit the spread of fire.

Additional aspects of the invention are subject of further independent claims.

Particularly preferred embodiments are outlined throughout the description and the dependent claims.

WAYS OF CARRYING OUT THE INVENTION

A first aspect of the present invention is directed to a mortar composition, in particular for preparing a viscoelastic structure and/or an acoustic damping element and/or a fire barrier, comprising or essentially consisting of:
 a) 15-50 wt.-% of a hydraulic binder,
 b) 5-35 wt.-% of lightweight aggregates,
 c) 5-25 wt. % of further aggregates which have a particle density that is higher than the particle density of the lightweight aggregates,
 d) 10-50 wt.-% of at least one polymer.

In particular, all amounts are with respect to the total weight of the mortar composition in dry state.

In the present context, the expression "hydraulic binder" in particular stands for substances that harden because of chemical reactions with water producing hydrates. Preferably, the hydrates produced are not water-soluble. In particular, the chemical reactions with water of the hydraulic binder takes essentially place independently of the water content. This means that the hydraulic binder can harden and retain its strength even when exposed to water, e.g. underwater or under high humid conditions.

The term "lightweight aggregates" stands in particular for aggregates with a particle density $\leq 2,000$ kg/m$^3$, preferably $\leq 1,500$ kg/m$^3$, especially $\leq 1,250$ kg/m$^3$. The particle density of an aggregate is the ratio between the mass of the particle material and the volume occupied by the individual particles. This volume includes the pores within the particle, but does not include voids between the particles. Especially, the particles of the aggregates can have any spherical and/or non-spherical geometric shape, either uniform or non-uniform. For example, the particles can be spherical-, conical-, polygonal-, cubic-, pentagon-, hexagon-, octagon-, prismatic and/or polyhedral-shaped. Non-uniform particles can have for example circular, elliptical, oval, square, rectangular, triangular or polygonal cross sections found at least partially therein. "Non-uniform" and "irregular" shaped particles refer to three-dimensional particle shapes wherein at least two different cross sections taken through said particles have different shapes.

In particular, the lightweight aggregates fulfill the requirements for lightweight aggregates as defined in DIN EN 13055:2016.

Especially, the mortar composition is a dry mortar composition. This means that the mortar composition is essentially free of water or an amount of water is below 1 wt. %, in particular below 0.5 wt. % or below 0.1 wt. %, with respect to the total weight of the mortar composition.

According to a preferred embodiment, the mortar composition is a one-component mixture. That means that all the individual materials and/or substances are intermixed. One-component compositions are in particular easy to handle and exclude the risk of a mix up or wrong dosing of individual components by users.

However, it is in principle possible to provide a two-component mortar composition or even a multi-component mortar composition. A first component may e.g. be present in a first receptacle comprising the hydraulic binder and the polymer. A second component, present in a second receptacle, may comprise the aggregates. Other distributions are possible as well. Two- or multi-component mortar compositions allow e.g. for adjusting the mortar composition with regard to specific applications.

A preferred amount of hydraulic binder is 15-45 wt. %, in particular 20-40 wt. %, especially 25-35 wt. %, with respect to the total weight of the mortar composition in dry state.

Preferably, the hydraulic binder comprises or consists of Portland cement, aluminate cement, sulphoaluminate cement, latent hydraulic and/or pozzolanic binder materials, calcium sulfate hemihydrate, anhydrite and/or hydrated lime.

Preferred Portland cement is according to norm EN 197, in particular of type CEM I. The term "alumina cement" stands in particular for a cement with an aluminum content, measured as $Al_2O_3$, of at least 30 wt. %, especially at least 35 wt. %, in particular 35-58 wt. %. Preferably, the alumina cement is alumina cement according to standard EN 14647. Preferably, the sulphoaluminate cement is calcium sulphoaluminate cement.

The term "latent hydraulic and/or pozzolanic binder materials" stands in particular for type II concrete additives with latent hydraulic and/or pozzolanic character according to EN 206-1. In particular, the latent hydraulic or pozzolanic binder material comprises or consists of slag, fly ash, silica fume, metakaolin and/or natural pozzolanes. Thereby, slag and/or fly ash, in particular furnace slag is especially preferred.

Calcium sulfate hemihydrate or $CaSO_4 \cdot 0.5\ H_2O$ may be present as α-hemi-hydrate or β-hemi-hydrate. Anhydrite is in particular anhydrite II and/or anhydrite III, whereas hydrated lime stands for calcium hydroxide.

Especially preferred, the hydraulic binder comprises aluminate cement and/or sulphoaluminate cement, preferably with a proportion of 1-15 wt. %, in particular 2-12 wt. %, especially 5-10 wt. %, with respect to the total weight of the mortar composition in dry state.

In particular, the hydraulic binder comprises Portland cement, preferably with a proportion of 10-30 wt. %, in particular 15-25 wt. %, especially 16-20 wt. %, with respect to the total weight of the mortar composition in dry state.

Especially, the hydraulic binder comprises Portland cement as well as aluminate cement and/or sulphoaluminate cement with a weight ratio of Portland cement to aluminate cement and/or sulphoaluminate cement from 1-5, especially 1.6-4, in particular 2-3.5.

In particular, the hydraulic binder comprises latent hydraulic and/or pozzolanic binder materials, especially slag and/or fly ash, preferably with a proportion of 1-15 wt. %, in particular 2-12 wt. %, especially 5-10 wt. %, with respect to the total weight of the mortar composition in dry state.

In particular, the hydraulic binder comprises aluminate cement and/or sulphoaluminate cement as well as latent hydraulic and/or pozzolanic binder materials with a weight ratio of aluminate cement and/or sulphoaluminate cement to the latent hydraulic and/or pozzolanic binder materials from 0.5-3, especially 0.7-2.5, in particular 1-2.

Especially, the hydraulic binder comprises Portland cement as well as latent hydraulic and/or pozzolanic binder materials with a weight ratio of Portland cement to the latent hydraulic and/or pozzolanic binder materials from 10-1, especially 7-1.5, in particular 5-3.

Preferably, the hydraulic binder comprises:
- 10-30 wt. %, in particular 15-25 wt. %, especially 16-20 wt. %, Portland cement;
- optionally 1-15 wt. %, in particular 2-12 wt. %, especially 5-10 wt. %, aluminate cement and/or sulphoaluminate cement;
- optionally 1-15 wt. %, in particular 2-12 wt. %, especially 5-10 wt. % latent hydraulic and/or pozzolanic binder materials, in particular slag and/or fly ash;
- optionally 0.5-8 wt. %, in particular 1-6 wt. %, especially 2-4 wt. %, calcium sulfate hemihydrate and/or anhydrite;
- optionally 0.1-5 wt. %, in particular 0.2-3 wt. %, especially 0.5-1.5 wt. %, hydrated lime;

whereby all amounts are with respect to the total weight of the mortar composition in dry state.

With regard to the lightweight aggregates, a particle density of the lightweight aggregates is preferably from 100-2,000 kg/m$^3$, especially 400-1,900 kg/m$^3$, preferably 700-1,500 kg/m$^3$ or 800-1,300 kg/m$^3$.

Especially, a proportion of the lightweight aggregates is from 7-30 wt. %, in particular 9-25 wt. %, especially 10-20 wt. %, with respect to the total weight of the mortar composition in dry state.

The lightweight aggregates can for example comprise or consist of cork, wood, rubber, plastic and/or porous particles.

According to preferred embodiments, the lightweight aggregates consist of inorganic particles. Especially, the lightweight aggregates do not comprise any cork, wood, plastics or rubber aggregates. This helps to improve the fire resistance of the mortar compositions.

Preferably, a particle size of the lightweight aggregates is from 0.01-2 mm, especially 0.02-1.5 mm, preferably 0.05-1.0 mm, in particular 0.08-0.5 mm or 0.09-0.3 mm.

In the present context, the particle size can e.g. be determined by laser diffraction as described in ISO 13320: 2009. Preferably, a particle size of non-spherical or irregular particles is represented by the equivalent spherical diameter of a sphere of equivalent volume. Especially, the lower values of the ranges given for the particle size represent D1 values whereas the upper values of the ranges given for the particle size represent D99 values. Put differently, in this case, 1% of the particles have a lower particle size than the lower value of a range, whereas 1% of the particles have a larger particle size than the upper value of a range.

Preferred lightweight aggregates comprise or consist of layered particles and/or porous particles. Especially the lightweight aggregates are chosen from porous particles. The term "layered particles" stands in particular for a material with a layered crystal structure. Especially, the layered material is a plate-like material. A plate-like material is in particular a material with a length and width larger than its thickness.

Thus, in a further preferred embodiment, the lightweight aggregates of the mortar composition comprise or consist of porous particles. In particular, the porous particles have a porosity of at least 25 vol. %, especially at least 50 vol. %, in particular at least 75 vol. %, with respect to the total volume of the porous particles.

Especially, the porous particles are chosen from expanded silica, volcanic rock, e.g. pumice and/or perlite. Expanded silica or expanded glass is highly preferred.

Especially preferred, the lightweight aggregates comprise or consist of porous inorganic particles, especially expanded silica.

If present, a layered material preferably is selected from clay and/or mica. Within the context of this invention, "clay" stands in particular for phyllosilicates and/or sheet silicates. Especially preferred, the layered material comprises or consists of vermiculite.

According to a preferred embodiment, the mortar composition comprises 7-22 wt. %, in particular 10-20 wt. %, especially 12-20 wt. %, with respect to the dry weight of the mortar composition Especially, a particle density of the further aggregates is at least 100 kg/m$^3$, in particular at least 250 kg/m$^3$, preferably at least 500 kg/m$^3$, higher than the particle density of the lightweight aggregates.

In particular, the further aggregates have a particle density >2,000 kg/m$^3$, especially >2,100 kg/m$^3$ or >2,200 kg/m$^3$.

A particle size of the further aggregates preferably is 0.01-2 mm, especially 0.02-1.5 mm, preferably 0.05-1.0 mm, in particular 0.08-0.3 mm or 0.1-0.2 mm.

In particular, the further aggregates comprise sand, quartz, calcium carbonate, natural river sand, gravel, basalt and/or metallic aggregates, especially sand and/or calcium carbonate.

Especially, a weight ratio of the lightweight aggregates to the further aggregates is from 0.1-5, especially 0.4-2.5, in particular 0.5-1.8, preferably 0.6-1.3 or 0.7-1.1.

In particular, the particle density of the lightweight aggregates is from 400-1,900 kg/m$^3$, preferably 700-1,500 kg/m$^3$ or 800-1,300 kg/m$^3$ and the further aggregates have a particle density >2,000 kg/m$^3$.

Especially, the particle density of the lightweight aggregates is from 700-1,500 kg/m$^3$ and the further aggregates have a particle density >2,100 kg/m$^3$.

Preferably, the lightweight aggregates comprise or consist of cork, wood, rubber, plastic and/or porous particles and the further aggregates comprise sand, quartz, calcium carbonate, natural river sand, gravel, basalt and/or metallic aggregates, especially sand and/or calcium carbonate.

A preferred amount of the at least one polymer is 15-45 wt. %, in particular 20-40 wt. %, especially 25-37 wt. %, with respect to the total weight of the mortar composition.

Preferably, the at least one polymer used in the mortar composition is a water-soluble or water-redispersible polymer, in particular a redispersible polymer. Such polymers have proven to be beneficial in the present mortar compositions. However, e.g. for specific purposes, other polymers might be suitable as well.

Preferably, the at least one polymer is present in solid state, especially as a powder.

Preferably, the at least one polymer has a glass transition temperature of −45-10° C., especially −35-5° C., preferably −25-0° C., in particular −20-0° C., particularly preferred −20--10° C. Such polymers can further improve the strength and noise suppression properties of the mortar composition. Most preferred are redispersible polymers with these glass transition temperatures.

The glass transition temperature is determined by Differential Scanning calorimetry according to standard ASTM E1356-08(2014).

Especially, the at least one polymer is a homopolymer or copolymer based on one or more monomers selected from a vinyl ester, vinyl acetate, vinyl alcohol, vinyl chloride, vinyl laureate, acrylic acid, acrylate, methacrylic acid, methacrylate, methylmethacrylate, acrylonitrile, styrene, butadiene, ethylene or mixtures thereof.

Highly preferred are copolymers based on vinyl esters, ethylene, styrene and/or acrylic acid ester, in particular a copolymer of vinyl acetate and ethylene and/or a copolymer of acrylic acid ester and styrene.

Preferably, the polymer is selected from poly(vinyl acetate-ethylen), poly(vinyl acetate-ethylen-methylmethacrylate), poly(vinyl acetate-ethylen-vinylester), poly(vinyl acetate-ethylen-acrylic acid ester), poly(vinyl acetate-ethylen-vinyl laureate), poly(vinyl acetate-vinyl versate), poly(acrylic ester-acrylonitrile), poly(acrylic ester-styrene butadiene) or mixtures thereof. Highly preferred as the polymer is a poly(vinyl acetate-ethylene) and/or poly(acrylic acid ester-styrene).

However, other polymers might be suitable as well.

According to a preferred embodiment, the polymer comprises two different copolymers, especially a copolymer of vinyl acetate and ethylene and a copolymer of acrylic acid ester and styrene. Thereby, preferably, a ratio of the two different copolymers is from 0.5-10:1, preferably 1-5:1, in particular 2.5-4:1. Put differently, the polymer preferably is present in the form of a mixture of two copolymers, especially a mixture of a first copolymer of vinyl acetate and ethylene, and a second copolymer of acrylic acid ester and styrene. Thus, in this case, the mortar composition comprises two different copolymers.

As it turned out, such kind of polymer mixtures are highly beneficial in the present context since they help to strongly improve the flexibility of the composition, especially the flexibility at 24 h after preparing the mortar composition.

In particular, a weight ratio of the at least one polymer to the lightweight aggregates is from 0.5-10, in particular 1-5, especially 1.2-3.5 or 1.7-2.5.

Preferably, a weight ratio of the at least one polymer to the hydraulic binder in the mortar composition is from 0.1-17, in particular, 0.2-7, especially, 0.3-5, particularly 0.4-2 or 0.7-1.5. This is in particular true if a weight ratio of the polymer to the lightweight aggregates is from 0.5-10, in particular 1-5, especially 1.2-3.5 or 1.7-2.5.

Especially, a weight ratio of the at least one polymer to Portland cement in the mortar composition is from 0.25-7, in particular, 0.75-5, especially, 0.9-4, particularly 1-3 or 1.2-2. This is in particular true if a weight ratio of the polymer to the lightweight aggregates is from 0.5-10, in particular 1-5, especially 1.2-3.5 or 1.7-2.5.

Furthermore, it can be beneficial if the mortar composition comprises at least one additive selected from the group consisting of setting time regulators, plasticizers, defoamers, rheology modifiers, thixotropic agents, aerating and/or foaming agents, anti-shrinkage agents, corrosion inhibitors, fire-retarding agents, fibers, and chromium reducers.

Preferably, a proportion of the additives in total is from 0-10 wt. %, especially 1-10 wt. % with respect to the weight of the mortar composition in dry state.

Especially the mortar composition comprises a rheology modifying agent. A proportion of the rheology modifying agent is preferably from 0.001-1 wt. %, in particular 0.2-0.5 wt. %, with respect to the weight of the mortar composition in dry state.

According to another preferred embodiment, the mortar composition comprises a plasticizer, whereby the plasticizer is in particular selected from the group of lignosulfonates, gluconates, naphtalenesulfonates, melamine sulfonates, vinyl copolymers and/or polycarboxylate ethers. Polycarboxylate ethers are preferred. In particular, the plasticizer is chemically different from the above-mentioned polymer and rubber. A proportion of polycarboxylate ethers is preferably from 0.001-1 wt. %, in particular 0.05-0.1 wt. %, with respect to the weight of the mortar composition in dry state.

Preferably, the mortar composition comprises fibers, in particular glass, plastic and/or cellulose fibers. Glass fibers and/or plastic fibers are highly preferred. Highly preferred plastic fibers are polyalkylene fibers, e.g. polyethylene fibers.

A proportion of the fibers is preferably from 0.001-3 wt. %, in particular 0.01-2.0 wt. %, especially 0.1-1 wt. %, with respect to the weight of the mortar composition in dry state.

In general, a preferred length of the fibers is from 0.05-12 mm, especially 0.05-5 mm. A diameter of the fibers is for example 0.5-1,000 µm, especially 1-100 µm, in particular 5-40 µm.

A preferred length of the glass fibers is from 0.5-12 mm, especially 2-5 mm. A diameter of the fibers is for example 0.5-1,000 µm, especially 1-100 µm, in particular 5-40 µm.

A preferred length of the plastic fibers is from 0.05-2 mm, especially 0.1-0.5 mm. A diameter of the plastic fibers is for example 0.5-1.00 µm, especially 1-100 µm, in particular 5-40 µm.

A proportion of a fire-retarding agent is chosen from 0-5 wt. % with respect to the total weight of the mortar composition in dry state. A fire-retarding agent can e.g. be chosen from inorganic substances, in particular form the list consisting of aluminum hydroxide, aluminum sulfate, borates, magnesium hydroxide, ammonium sulfate, expanded graphite and red phosphorus. However, in addition or alternatively to inorganic substances, it is also possible to use organohalogen compounds and/or organophosphorus compounds.

A preferred mortar composition comprises or essentially consists of:
- 16-20 wt.-% of Portland cement;
- optionally 5-10 wt. % aluminate cement and/or sulphoaluminate cement;
- optionally 5-10 wt. % latent hydraulic and/or pozzolanic binder materials, in particular slag;
- 10-20 wt. % lightweight aggregates in the form of porous inorganic particles, especially expanded glass, preferably with a particle size of 0.08-0.5 mm;
- 10-20 wt. % of further aggregates, especially sand and/or quartz, preferably with a particle size of 0.08-0.3 mm;
- 25-40 wt.-%, of polymer with a glass transition temperature of −20-45° C., whereby, preferably, the polymer is a copolymer of vinyl acetate and ethylene and/or a copolymer of acrylic acid ester and styrene.

whereby all amounts are with respect to the total weight of the mortar composition in dry state.

A highly preferred mortar composition comprises or essentially consists of:
- 16-20 wt.-% of Portland cement;
- 5-10 wt. % aluminate cement and/or sulphoaluminate cement;
- optionally 5-10 wt. % latent hydraulic and/or pozzolanic binder materials, in particular slag;
- 10-20 wt. % lightweight aggregates in the form of expanded glass, preferably with a particle size of 0.08-0.5 mm;

10-20 wt. % of further aggregates in the form of sand and/or quartz, preferably with a particle size of 0.08-0.3 mm;

25-37 wt.-%, of polymer with a glass transition temperature of −20-0° C., whereby, preferably, the polymer is a copolymer of vinyl acetate and ethylene and/or a copolymer of acrylic acid ester and styrene;

whereby, preferably, a weight ratio of the polymer to the lightweight aggregates is from 1-5, especially 1.2-3.5 or 1.7-2.5;

whereby, preferably, a weight ratio of the lightweight aggregates to the further aggregates is from 0.4-2.5, in particular 0.5-1.8, preferably 0.6-1.3 or 0.7-1.1;

whereby all amounts are with respect to the total weight of the mortar composition in dry state.

Another aspect of the present invention relates to a method for producing a processable mortar composition, comprising the step of adding water to a mortar composition as described above.

Thereby, preferably, a weight ratio of water to the mortar composition in dry state is from 0.20-0.50, in particular 0.22-0.40, especially 0.23-0.34 or 0.24-0.30.

Another preferred range of the ratio of water to the mortar composition in dry state is from 0.20-0.25. When keeping the ratio in the range of 0.20-0.25, a non-dripping composition is obtained. This is highly beneficial for vertical applications.

Also preferred is a range of the ratio of water to the mortar composition in dry state of 0.27-0.50. In this range, self-levelling compositions are obtained. Such compositions are e.g. beneficial for horizontal applications, e.g. for flooring.

A further aspect of the present invention is a hardened mortar composition obtainable by adding water to a mortar composition as described above or obtainable by the method as described above. Preferably, the mortar composition is placed on a substrate, in particular on a floor, especially made of metal and/or concrete.

Preferably, the hardened mortar composition is present in the form of a layer, a coating and/or a sheet, especially placed on a substrate. Preferably, a thickness of the hardened mortar composition is from 0.5-20 mm, especially 1-10 mm, preferably 1-5 mm.

Another aspect of the present invention relates to a shaped body, in particular a flat layer, comprising a hardened mortar composition. The hardened mortar composition is a mortar composition as defined above after hardening with water. Put differently, the hardened mortar composition is obtainable by mixing water with a mortar composition as defined above.

In particular, the shaped body features viscoelastic properties. This means that the shaped body exhibits a phase lag between strain and corresponding stress resulting in the ability to store and dissipate energy at the same time. This is in contrast to e.g. elastic bodies where stress and strain remain in phase.

In particular, the shaped body is a flat layer, in particular with a thickness of 0.5-10 mm, preferably 1-5 mm. Within the present context, a flat layer is in particular a body with a width and a length larger than its thickness.

Shaped bodies with the above mentioned properties are especially suitable for viscoelastic structures or acoustic damping elements.

A further aspect of the present invention relates to a structure, in particular a floor, a wall or a ceiling, comprising the above described shaped body. Preferably, a support element and/or a cover element is attached to the shaped body. The cover element can e.g. be a constraining layer.

In particular, the structure is a deck structure of a ship or an offshore installation.

Especially, the shaped body is arranged between the support element and the cover element. In this configuration, the shaped body is constrained between the support element and the cover element.

In particular, the support element is a metal layer, in particular made of steel and/or aluminum. A preferred cover element is formed as flat layer.

Especially, the cover element is a cement based layer, e.g. a mortar layer, and/or a metal based layer. If the cover element is a cement based layer, the cement based layer is chemically different from the shaped body and/or the mortar composition of the present invention.

In another preferred embodiment, the cover element is a metal based layer, especially comprising or consisting of metallic plates and/or tiles.

Preferably, a coverage of the cover element is at least 50%, especially at least 75% or at least 90%, with respect to the area covered by the shaped body.

In further preferred embodiments, the cover element can be covered with at least one further layer, e.g. an insulation layer and/or a further functional covering.

Optionally, it is possible to have a primer between the support element and the shaped body. This might further increase the adhesion between the support element and the shaped body. Also, a primer can be present between the shaped body and the cover element.

Preferably, the structure, especially a deck structure of a ship or an offshore installation, comprises or consists of:
  a metallic support element, especially a metallic deck, preferably made of steel and/or aluminum;
  a shaped body as described above, especially with a thickness of 0.5-10 mm, preferably 1-5 mm;
  a cover element, in particular a metallic cover element, e.g. metallic tiles and/or plates, whereby, preferably, a coverage of the cover element is at least 75%, especially at least 90%;
  optionally, an insulation layer, in particular made of mineral wool;
  optionally, a deck covering.

However, other structures can be produced as well.

In particular, "mineral wool" stands for any fibrous material formed by spinning or drawing molten mineral or rock materials, such as e.g. stone, glass, slag and/or ceramics. Especially, the mineral wool is present on the form of fabric, preferably consisting to an extent of at least 75 wt. %, preferably at least 90 wt. % or 95 wt. % of fibrous material consisting of stone, glass, slag and/or ceramics.

Especially preferred the insulation layer comprises or consist of stone wool, slag wool and/or glass wool.

According to another preferred embodiment, the structure comprises or consists of:
  a body of a vehicle, especially an automotive body, whereby preferably the body is essentially made of metal, plastics and/or a composite material. In particular, the metal is chosen from steel and/or aluminum, and/or the composite material is chosen from fiber composite material, such as e.g. carbon-fiber reinforced polymers and/or glass-fiber reinforced polymers;
  optionally, at least one intermediate layer, especially with a thickness from 0.5-1,000 μm, especially 1-500 μm or 5-100 μm. In particular, the intermediate layer is chosen from a primer, a paint, and/or a coating. Especially, the intermediate layer comprises or essentially consists of an electrophoretically deposited layer, in particular if the body comprises or essentially consists of metal. In particular the intermediate layer is an intermediate layer deposited by electrocoating, cathodic electrodeposition, anodic electrodeposition, electrophoretic coating, electrophoretic painting and/or cathodic dip-paint coating (KTL). Especially, the intermediate layer is deposited by cathodic dip-paint coating. In particular, the cathodic dip-paint coating is a coating based on polymers, especially epoxy polymers and/or (meth) acrylic-polymers. Cathodic dip-paint coating typically ensures effective and long-lasting corrosion protection with high temperature resistance and chemical resistance. In addition it is scratch-resistant and protects against stone chipping;

a shaped body as described above, especially with a thickness of 0.5-10 mm, preferably 1-5 mm, which is attached to the body of the vehicle and/or the intermediate layer.

Thus, it is possible to attach the shaped body to a body of a vehicle, which might optionally be coated with at least one intermediate layer, in order to reduce noise and vibrations and/or in order to produce a fire barrier in the body of a vehicle.

In this case, in particular, the shaped body can be essentially uncovered. Put differently, in this case, the shaped body does not comprise any cover element.

However, it is also possible to add a cover element on top of the shaped body for specific purposes.

Such structures comprising a body of a vehicle are especially lightweight, can be produced in a highly efficient manner as explained below in more detail and are highly suitable for electrically driven vehicles, especially electrically driven automotives.

Another aspect of the present invention relates to a method for the production of a structure, whereby the mortar composition of the present invention is mixed with water, applied on a support structure and covered with a cover element. Thereby, the support structure and the cover element are defined as described above. Especially, the mortar composition is applied with a thickness of 0.5-10 mm, especially 1-5 mm.

According to a preferred embodiment, the support element used in the method is a metal layer, in particular made of steel and/or aluminum. A preferred cover element is formed as flat layer. Especially, the cover element is a cement based layer, e.g. a mortar layer and/or a metal based layer, e.g. comprising or consisting of metallic plates and/or tiles.

In another method for producing a structure, especially comprising a body of a vehicle, the mortar composition of the present invention is mixed with water in order to obtain a processable composition and applied on a support structure, especially a body of a vehicle, in particular an automotive body. Thereby, preferably, the processable composition is sprayed onto the support structure, especially a vehicle body.

Preferably, the body of the vehicle comprises an intermediate layer, especially with a thickness from 0.5-1,000 µm, especially 1-500 µm or 5-100 µm. In particular, the intermediate layer is chosen from a primer, a paint, and/or a coating as described above. Especially, the intermediate layer is a cathodic dip-paint coating (KTL). In particular, the cathodic dip-paint coating is a coating based on polymers, especially epoxy polymers and/or (meth)acrylic-polymers.

Thus, in an exemplary method, a body of a vehicle, especially an automotive body, is treated in a cathodic dip-paint coating and, subsequently, a processable mortar composition of the present invention is applied onto the cathodic dip-paint coating and/or on a further intermediate layer.

In particular, the processable mortar composition is applied on specifically selected areas of the body of the vehicle in order to achieve vibration and/or noise reduction and/or in order to build-up a fire barrier.

Especially, the processable mortar composition is applied onto the body of the vehicle in the form of one, two, three, four, five or even more strips, circles, polygons and/or complex shapes. In particular, the mortar composition is applied with an essentially constant thickness and/or with non-constant thickness.

Highly preferred, the processable mortar composition is applied with an automatic application system, especially with a manipulator capable of moving a discharge spray nozzle in at least one, preferably at least two, especially preferred at least three, dimensions. Highly preferred, the processable mortar composition is applied with a robotic arm.

This is especially preferred with vehicle bodies having complex structures such as automotive bodies, since a manipulator can easily reach poorly accessible areas and precisely follow uneven surfaces. In addition, with the inventive method there is no need to produce prefabricated dampening elements which need to be installed afterwards. Thus, there is no need keep prefabricated dampening elements on stock. Rather the dampening elements can be produced directly. With the inventive method it is even possible to apply the mortar compositions in different vehicle bodies with one and the same manipulator. All that needs to be changed from vehicle body to vehicle body is the computer program which controls the manipulator. Hence, the inventive method is highly flexible, fast and efficient.

Overall, with the inventive method it is possible to obtain bodies of vehicles, especially automotive bodies, with good sound and vibration dampening properties. Thereby, parts of the vehicle bodies covered with the inventive mortar compositions even can act as fire barriers what is especially preferred in electrically driven vehicles.

An additional aspect of the present invention relates to uses of the mortar composition and the shaped body as herein described. Especially preferred, the mortar composition and/or the shaped body is used on structural element, a floor, on a wall and/or on a ceiling, preferably on a floor.

Especially, the mortar composition and/or the shaped body is used for acoustic damping, in particular in a vehicle, a building and/or an offshore installation, especially in an automobile or in a ship.

Also the mortar composition and/or the shaped body can be used in a fire protection system, especially as a firewall and/or a fire barrier, as a fire resistant coating and/or barrier, in particular in a vehicle, a building and/or an offshore installation, especially in an automobile or in a ship.

In particular, the mortar composition and/or the shaped body is used in combination for acoustic damping and in a fire protection system, especially as a firewall and/or a fire barrier. This in particular in a vehicle, a building and/or an offshore installation, especially in an automobile or in a ship.

Moreover, the mortar composition and/or the shaped body can be used as an underlay and/or primer for a cover element on a support structure.

Further preferred, the mortar composition and/or the shaped body is used for increasing adhesion between the support structure and the cover element. Thereby, the cover element is preferably a mortar layer and/or a metal based layer and the support structure is preferably a metal layer, in particular made of steel and/or aluminum.

Further advantageous configurations of the invention are evident from the exemplary embodiments.

BRIEF DESCRIPTION OF THE DRAWINGS

The drawings used to explain the embodiments show.

In principle, identical parts are provided with the same reference numbers in the figures.

EXEMPLARY EMBODIMENTS

1. Mortar Compositions

Figure 1:
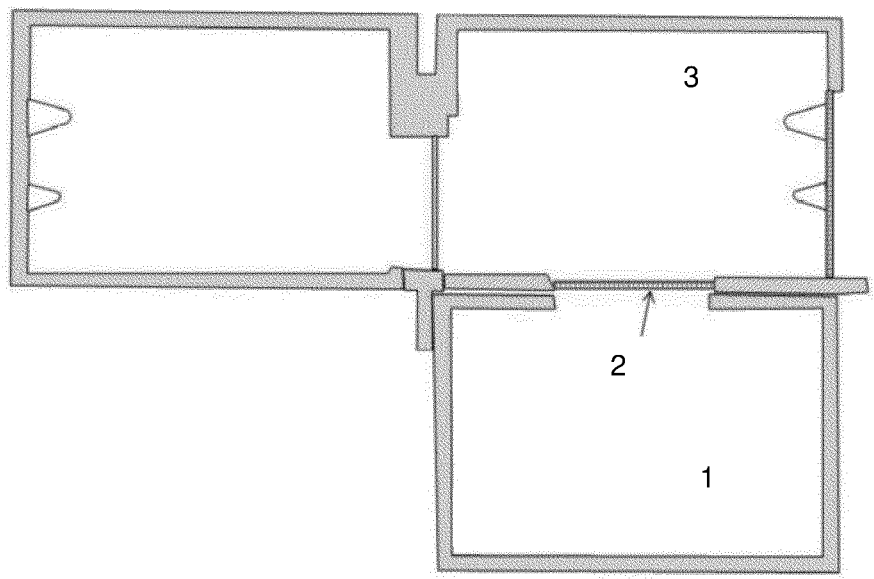
FIG. 1 A schematic cross-section through the test setup in which the acoustic measurements were performed. The setup comprises two reverberant rooms (1, 2) with a common opening for receiving test decks (2)

Table 1 shows three mortar compositions M1-M3. The mortar compositions have been prepared by intermixing all of the components in dry state. The mortar composition M1-M3 are present as dry powders.

TABLE 1

| Mortar compositions | | | |
|---|---|---|---|
| Component | M1 | M2 | M3 |
| Hydraulic binder [wt. %] | | | |
| Portland cement (CEM I, 52.5N) | 18 | 18 | 18 |
| Calcium aluminate cement[1] | 6.5 | 6.5 | 6.5 |
| Anhydrite[2] | 2.3 | 2.3 | 2.3 |
| Slag | 5 | 5 | 5 |
| Lightweight aggregates [wt. %] | | | |
| Expanded glass[3] | 15 | 15 | 15 |
| Further aggregates [wt. %] | | | |
| Sand[4] | 14.8 | 19.8 | 23.8 |
| Polymer [wt. %] | | | |
| Redispersible copolymer[5] | 7.5 | 7.5 | 5.0 |
| Redispersible copolymer[6] | 27.5 | 22.5 | 20.0 |
| Additives [wt. %] | | | |
| Plasticizer[7] | 0.08 | 0.08 | 0.08 |
| Glass fibres[8] | 0.15 | 0.15 | 0.15 |

TABLE 1-continued

| Mortar compositions | | | |
|---|---|---|---|
| Component | M1 | M2 | M3 |
| Polyethylene fibres[9] | 0.3 | 0.3 | 0.3 |
| Processing additives[10] | 2.87 | 2.87 | 3.87 |

[1] Isidac 40, calcium aluminate cement, Cimsa, Turkey
[2] Raddipur, CASEA GmbH, Germany
[3] Rotocell, particle size 0.09-0.30 mm, Rotec, Germany
[4] Quartz sand with particle size 0.1-0.2 mm.
[5] Highly flexible dispersion powder based on vinylacetate-ethylene copolymer (Tg = −7° C.)
[6] Redispersible polymer powder based on styrene-acrylicacid ester copolymer (Tg = −15° C.)
[7] Melflux 5581F, polycarboxylate ether, BASF Germany
[8] Cem-Fil, type 70/30, glass fibers, 3 mm length, 20 µm diameter, Owens Corning Composite Materials LLC, USA
[9] Fibers F PE 930 T, 0.2-0.5 mm length, 10 µm diameter, Brenntag, Polska
[10] Defoamer, rheology modifiers, thixotropic agents, retarder Mortar compositions M1-M2 have been mixed with water (weight ratio of water to total weight of dry mortar composition=0.29) in order to obtain processable compositions.

3. Processing Properties

Flow table spread values were assessed according standard EN 12350-5:2009. Directly after preparation values in the range of 176 mm (composition M1) and 173 mm (composition M2) were obtained. Thus, the mortar compositions show a flow behavior which makes processing easy.

3. Adhesion Properties

Mortar compositions M1 and M2 have been applied with a thickness of 2 mm on a cleaned flat steel plate.

For reason of comparison, a similar system has been prepared with 2 mm SikaFloor® Marine PU-Red (polyurethane based layer) instead of the mortar composition M1.

Adhesion test carried out similar to standard EN 1348: 2007 with the mortar compositions on steel substrates showed bond strengths of:
- 0.8 MPa for composition M1 and 1.3 MPa for composition M2 after 7 days;
- 1.0 MPa for composition M1 and 1.3 MPa for composition M2 after 28 days;
- 0.9 MPa for the comparative composition after 7 days as well as after 28 days.

Thus, with regard to adhesion on steel, the inventive mortar compositions can compete with polyurethane based systems.

4. Acoustic Properties

4.1 Test Facilities

The measurements were carried out in two reverberant rooms as shown in FIG. 1. The rooms are built on two separate foundations made of concrete with a wall thickness of 30 cm. Between the source room 1 and the receiving room 3 there is an opening of 2.99 m×3.37 m, i.e. in the ceiling of the source room 1 and in the floor of the receiving room 3, where a test deck 2 is installed. The volume of the source room 1 and receiving room 3 is 243 m³ and 230 m³, respectively.

Excitation of the test deck 2 with airborne noise and impact noise is carried out with loudspeakers and a tapping machine as stated in standard ISO 10140:2010.

Figure 2:
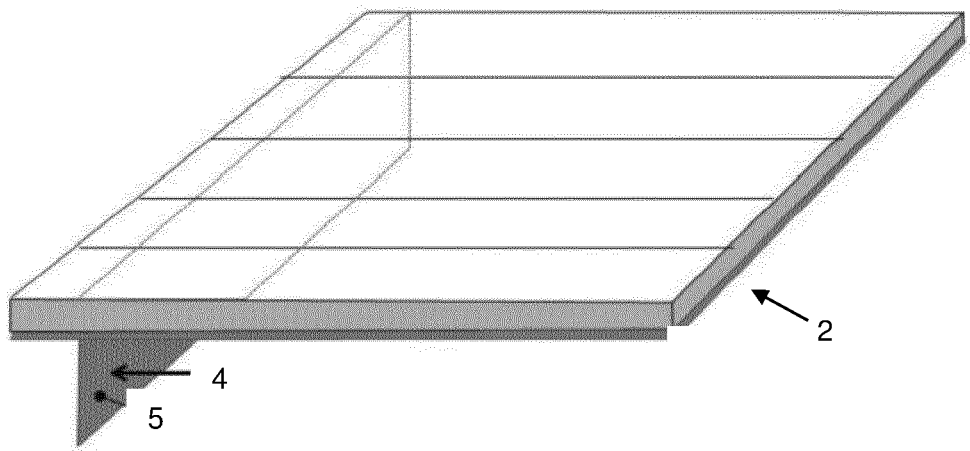
FIG. 2 A perspective view of a test deck (2) with a vibration exciter (4)

Excitation of the test deck 2 with structure-borne noise is performed by means of a vibration exciter 4 coupled to a steel plate 5, which is mounted perpendicularly and below the steel deck positioned in the opening, as shown in FIG. 2. By means of this arrangement a reverberant vibrational field is established both in the steel plate coupled to the exciter and the steel deck simulating the real conditions occurring in a ship structure.

4.2 Measurements According to ISO 10140:2010

Measurements according to ISO 10140:2010 were performed as follows:

During the airborne and structure-borne sound measurements the excitation is performed by means of broadband pink noise in the frequency range 20-10000 Hz.

The response, i.e. the sound pressure level in the receiving room 3 for the airborne and impact sound insulation measurements or the velocity level on the floor for the structure borne sound measurements, are measured in one-third octave filter bands with center frequencies from 50 Hz to 5000 Hz.

Measurements in the one-third octave filter bands of 50 Hz, 63 Hz and 80 Hz are not required according to ISO 10140:2010. However, based on experience from previous measurements on ships, it seems reasonable to include these frequency ranges.

All relevant instruments in the test setup are calibrated before and during the testing period for every construction.

4.3 Measurements According to ASTM E2963-16

The reference deck must not be removed from the test opening during the measuring series. This is necessary in order not to introduce differences due to the mounting in the test facilities.

Measurements of transmission loss and acceptance will be performed simultaneously with airborne noise excitation in the source room. Measurements of sound absorption are done in connection with the transmission loss measurements. Measurements of transmission loss are performed in accordance with ASTM E90-09.

Primarily, the damping properties for the constrained damped test constructions was determined of the loss factor using the test beam method e.g. as described in ASTM E756-5(2010).

All calculations are performed for each one-third octave band frequency.

4.4 Tests Decks

Figure 3:
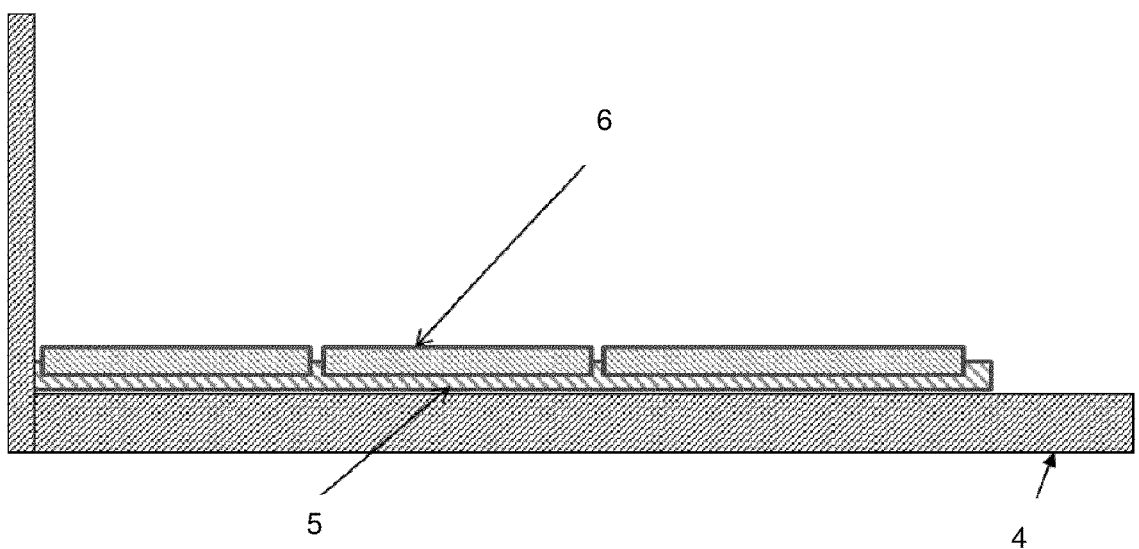
FIG. 3 A cross-section of a floor structure on a steel deck (4). The floor structure comprises a hardened mortar composition (5) which is covered by steel plates (6)

Example 1: The floor is a constrained damped construction on a steel deck 4 as shown in FIG. 3. The constrained damped construction is consisting of 1 mm viscoelastic damping layer 5 of mortar composition M2. The density of compound is 1,300 kg/m$^3$. On top of the damping layer 1.5 mm steel plates 6 with coverage of 90% are applied. The total surface mass is approximately 11.9 kg/m$^2$ for the total construction. The total building height is 2.5-3 mm.

Example 2: In example 2, a constrained damped construction consisting of 3 mm viscoelastic damping layer of mortar composition M2 was used. Otherwise, the setup was identical to example 1.

Figure 4:
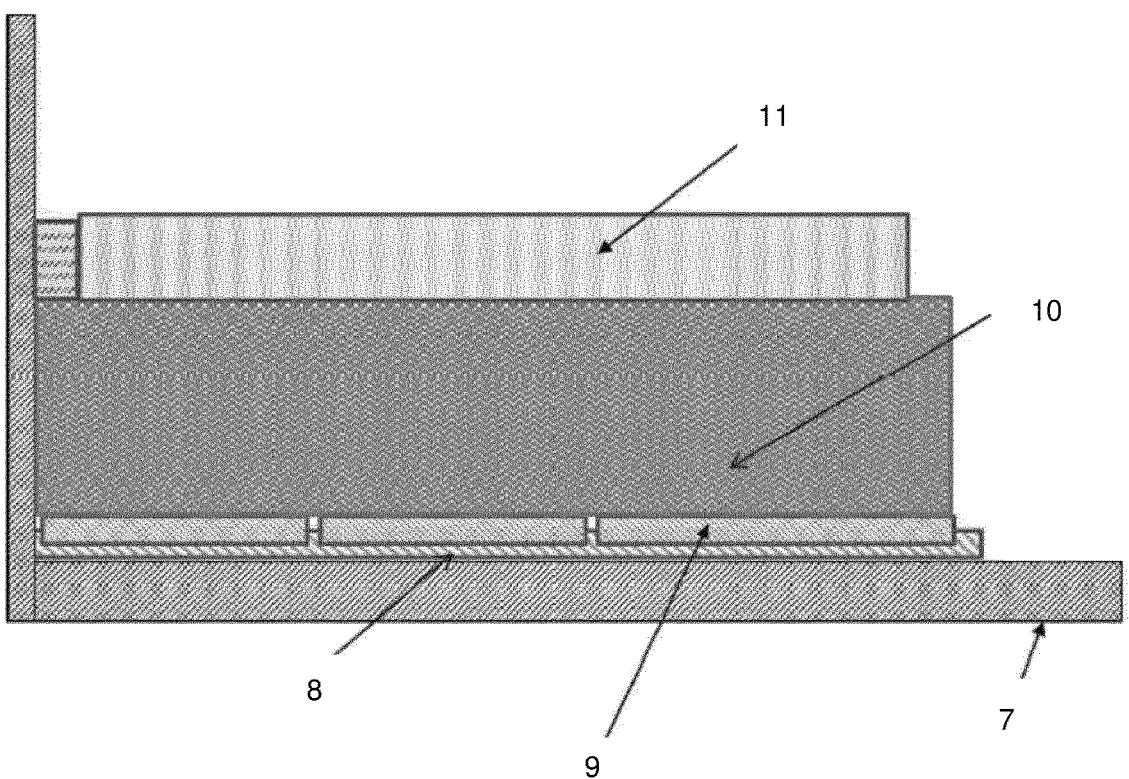
FIG. 4 A cross-section of another floor structure on a steel deck (7). The floor structure comprises a hardened mortar composition (8) covered by steel plates (9) and a floating floor (10, 11) on top.

Example 3: The floor is a combined constrained damped and floating floor construction on a steel deck 7 as shown in FIG. 4. The constrained damped construction is consisting of an approximately 1.5 mm viscoelastic damping layer 8 of mortar composition M2. The density of compound is 1,300 kg/m$^3$. On top of the damping layer 1.5 mm steel plates 9 with coverage of 90% are applied.

On top, a floating floor is applied which consists of 50 mm mineral wool 10 (type SeaRox SL 436), with a density of 140 kg/m$^3$. The top layer 11 consists of 25 mm Litosilo X. The total surface mass is approximately 45.9 kg/m$^2$ for the total construction. The total building height is 78 mm.

Example 4: For reasons of comparison, in example 4, a constrained damped construction consisting of 1 mm SikaFloor® Marine PU-Red (polyurethane based layer) instead of the mortar composition M2 was used. Otherwise, the setup was essentially identical to example 1.

4.5 Results

Figure 6:
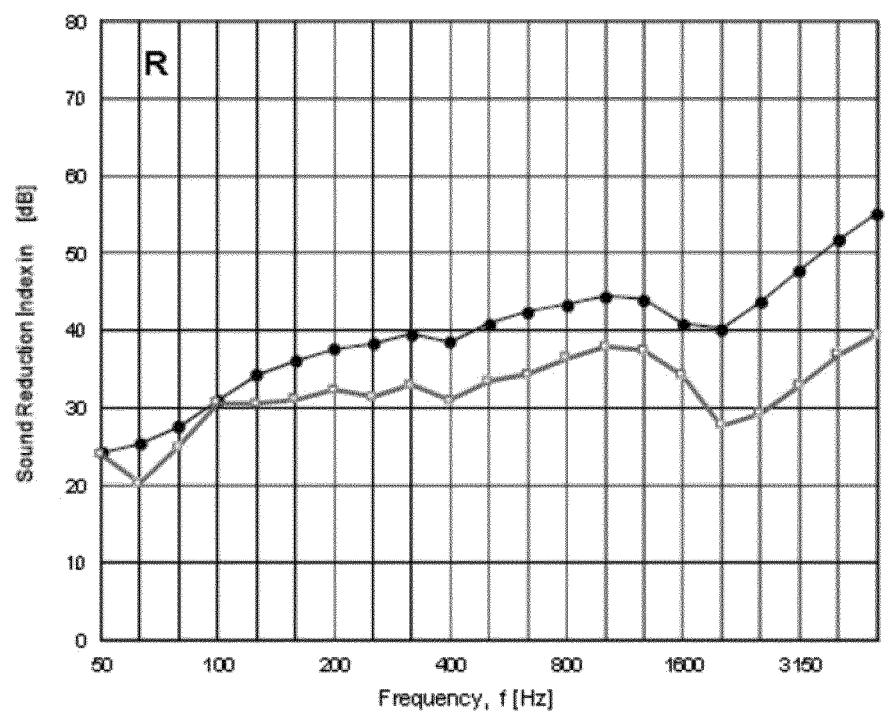
FIG. 6 The measured sound reduction indexes R for a mortar composition (closed circles) as well as a bare steel deck (open circles).

For illustration, FIG. 6 shows the measured sound reduction index R for the mortar composition M2 of example 1 expressed in dB per one-third octave frequency bands (closed circles). For comparison the results of the measurements on the bare steel deck are also shown (open circles). The difference between the curves for the test deck and the curves for the reference steel deck thus indicates the improvement in the sound reduction and the impact sound insulation caused by the applied floor construction.

Table 2 gives an overview of measured characteristic properties for the three examples.

TABLE 2

| Characteristic properties | | | | |
|---|---|---|---|---|
| | Example 1 (cf. FIG. 3) | Example 2 (cf. FIG. 3) | Example 3 (cf. FIG. 4) | Example 4 (cf. FIG. 3) |
| R'w (weighted sound reduction index according to EN ISO 717-1:2013) | 43 dB | 43 dB | 58 dB | 45 dB |
| $L_{n,w}$ (weighted normalized impact sound pressure level according to EN ISO 717-2: 2013) | 92 dB | 92 dB | 56 dB | — |
| Calculated Impact Insulation Class IIC according to E989 ASTM | 18 dB | 18 dB | 53 dB | — |
| STC (weighted Sound Transmission Class according to ASTM E413-10 Classification for Rating Sound Insulation) | 43 dB | 43 dB | 59 dB | — |

Thus, all of the tested examples 1-3, clearly show a significant noise and vibration suppression, which is at least comparable with standard PU-based systems (example 4). Thus, mortar compositions according to the present invention can be used as replacements for known polyurethane systems.

5. Fire Resistance

Figure 5:
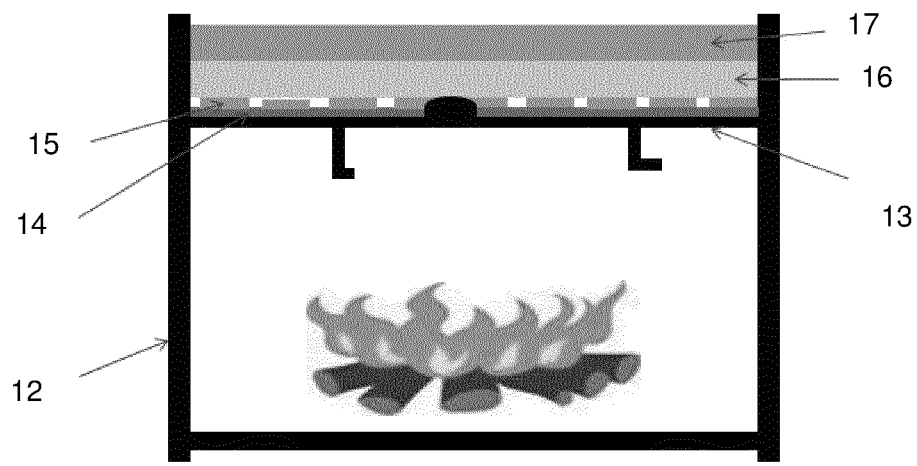
FIG. 5 A cross-section of a setup used for fire test comprising a furnace (12) which is covered with a steel deck (13). On top of the steel deck (13), a floor structure (14, 15, 16, 17) is applied.

Fire tests have been performed in a furnace 12 covered with a steel deck 13 with a thickness of 8 mm and an area of 10 m$^2$, as depicted in FIG. 5. The steel deck 12 was covered with a layer 14 of about 1 mm of mortar composition M2. On top of layer 14, steel plates 15 with coverage of about 90% as well as an insulation 16 and a deck covering 17 were applied.

Fire tests have been performed in line with the international code for application of fire test procedures, 2010 (International Maritime Organization, resolution msc.307 (88), adopted on 3 Dec. 2010.

The tests have shown that the setup prevents the passage of flame and smoke for 60 minutes. An average temperature rise on the unexposed deck side was less than 140° C. above the temperature before starting the standard fire test. Overall, with the inventive mortar composition it is possible to produce class A-60 type decks.

In summary, the inventive mortar compositions can be used for producing effective fire barriers.

Therefore, mortar compositions according to the present invention can indeed be used as improved replacements for known polyurethane systems.

Thus, it will be appreciated by those skilled in the art that the present invention can be embodied in other specific forms without departing from the spirit or essential characteristics thereof. The presently disclosed embodiments are therefore considered in all respects to be illustrative and not restricted.

The invention claimed is:

1. A mortar composition, comprising:
   a) 15-50 wt.-% of a hydraulic binder;
   b) 5-35 wt.-% of lightweight aggregates;
   c) 5-25 wt. % of further aggregates which have a particle density that is higher than the particle density of the lightweight aggregates; and
   d) 10-50 wt.-% of at least one polymer,
   wherein a particle density of the lightweight aggregates is from 100-2,000 kg/m$^3$, and the further aggregates have a particle density >2,000 kg/m$^3$.

2. The mortar composition according to claim 1, wherein the hydraulic binder comprises Portland cement as well as aluminate cement and/or sulphoaluminate cement with a weight ratio of Portland cement to aluminate cement and/or sulphoaluminate cement from 1-5.

3. The mortar composition according to claim 1, wherein the lightweight aggregates comprise inorganic particles and wherein a particle size of the lightweight aggregates is from 0.01-2 mm.

4. The mortar composition according to claim 1, wherein the further aggregates are selected from sand, quartz, and/or calcium carbonate, whereby a particle size of the further aggregates is from 0.01-2 mm.

5. The mortar composition according to claim 1 wherein a weight ratio of the lightweight aggregates to the further aggregates is from 0.1-5.

6. The mortar composition according to claim 1, wherein the polymer is a water soluble or water redispersible polymer.

7. The mortar composition according to claim 1, wherein the polymer comprises two different copolymers, a copolymer of vinyl acetate and ethylene and a copolymer of acrylic acid ester and styrene, wherein a ratio of the two different copolymers is from 0.5-10:1.

8. The mortar composition according to claim 1, wherein a weight ratio of the polymer to the lightweight aggregates is from 0.5-10.

9. The mortar composition according to claim 1, comprising:
   16-20 wt.-% of Portland cement;
   5-10 wt. % aluminate cement and/or sulphoaluminate cement;
   5-10 wt. % latent hydraulic and/or pozzolanic binder materials;
   10-20 wt. % lightweight aggregates in the form of porous inorganic particles:
   10-20 wt. % of further aggregates; and
   25-40 wt.-%, of at least one polymer with a glass transition temperature of −20-45° C.,
   whereby all amounts are with respect to the total weight of the mortar composition in dry state.

10. A shaped body comprising a mortar composition according to claim 1 after hardening with water.

11. A structure comprising a shaped body according to claim 10 and a support element and/or a cover element being attached to the shaped body.

12. The structure according to claim 11, comprising:
   a metallic support element;
   the shaped body;
   the cover element;
   an insulation layer; and
   a deck covering.

13. A method for acoustic damping, comprising applying the mortar composition of claim 1 to a vehicle, a building and/or an offshore installation.

14. A method of forming a fire protection system, comprising:
   applying the mortar composition of claim 1 to a firewall and/or a fire barrier.

15. The mortar composition according to claim 1, wherein a particle density of the lightweight aggregates is from 400-2,000 kg/m$^3$.

* * * * *